Patented Sept. 2, 1947

2,426,647

UNITED STATES PATENT OFFICE 2,426,647

MANUFACTURE OF SULFUR COMPOUNDS

Walter A. Schulze and Willie W. Crouch, Bartlesville, Okla., assignors to Phillips Petroleum Company, a corporation of Delaware No Drawing. Application October 19, 1943, Serial No. 506,903

16 Claims. (Cl. 260—609)

This invention relates to an improved process for the manufacture of organic sulfur compounds. In a specific embodiment, this invention relates to the direct addition of a compound having the formula RSH, in which R represents hydrogen or an organic radical substantially inert under the reaction conditions used, to an ethylenic linkage in an organic compounds, in the presence of a novel catalyst to produce mercaptans and/or organic sulfides. A more specific and preferred embodiment involves the manufacture of useful mercaptans from olefins and hydrogen sulfide through the agency of an addition compound of boron fluoride and an oxygen-containing acid of phosphorus, and the invention will be described in detail with particular reference to this embodiment.

The direct synthesis of organic sulfur compounds, especially mercaptans and sulfides (thioethers), by the addition of hydrogen sulfide or mercaptans to olefinic materials, with or without the presence of a catalyst has been reported by various investigators. However, the specificity of these reactions has not been of the order frequently desired, due to the elevated temperatures employed and/or lack of activity or specific action of the catalysts proposed.

An object of this invention is to manufacture organic sulfur compounds.

Another object of the present invention is to manufacture mercaptans by the direct addition of hydrogen sulfide to an olefinic linkage.

Another object is to effect catalytically the addition of (1) hydrogen sulfide or (2) mercaptans, to olefinic materials to produce (1) mercaptans and/or sulfides or (2) sulfides.

An additional object of this invention is to effect catalytically the direct addition of hydrogen sulfide to aliphatic, substituted aliphatic, and cyclic olefins to yield the corresponding mercaptan derivatives.

Another object of the invention is to effect the aforesaid reaction in the presence of a liquid catalyst comprising an addition compound of boron fluoride with phosphoric acid.

A further object of the present invention is to provide an efficient process for the conversion of olefins and hydrogen sulfide to valuable mercaptan products.

Further objects and advantages of the invention will be apparent, to one skilled in the art, from the accompanying disclosure and description.

We have now found that the sulfur-compound-forming reactions referred to above are efficiently and smoothly promoted under exceptionally mild reaction conditions by a liquid catalyst comprising an addition compounds of boron fluoride with phosphoric acid. Since the catalyst of this invention is exceedingly active, it may be applied at relatively low temperatures to a great variety of olefinic materials of low and high molecular weight to yield the desired corresponding sulfur compounds with a minimum of undesirable secondary reactions.

Our novel and active catalyst may be applied to the reaction between mercaptans and olefinic hydrocarbons to produce sulfides. It may also be applied to the reaction between $H_2S$ and olefins to produce mercaptans as herein discussed. While in the latter reaction some formation of sulfides may be expected due to a secondary reaction between the product mercaptan and the olefin or to other factors, it has been found in practice that such sulfide formation may be kept to a desired low and even negligible value by maintaining a substantial excess of $H_2S$ in the reaction zone and/or by operating at moderate temperatures which are still adequate for effecting the addition of $H_2S$ to olefins. On the other hand, when it is desired to produce sulfides as the product of an olefin-$H_2S$ reaction, the yield of sulfides may be materially increased by suitable control of reaction conditions, as by operating with higher olefin:$H_2S$ ratios. In any case, the activity of our catalysts makes possible the carrying out of the chosen reaction under moderate conditions which enable control of product to an exceptionally advantageous degree.

The process of the present invention in preferred embodiment comprises the contacting of controlled proportions of olefinic hydrocarbon, or mixtures of olefinic hydrocarbons, and hydrogen sulfide or mercaptan with a liquid boron fluoride-phosphoric acid catalyst under conditions selected to produce a substantial conversion of olefin to the corresponding mercaptan or sulfide, as the case may be. For example, in the case of the mercaptan-forming reaction, the hydrocarbon-hydrogen sulfide blend may be continuously contacted with the catalyst under conditions selected to insure thorough dispersion of the catalyst in the reactants, followed by a quiescent zone where the catalyst phase is continuously separated from the reaction products and returned to the contacting zone. The product layer may be continuously withdrawn from the catalyst separator and processed by suitable fractionation to separate hydrogen sulfide and minor impurities from the desired mercaptan product. Alternatively, the reaction may be carried out as a batch operation with intermittent injection of feed to the contacting zone and intermittent withdrawal and subsequent processing of the product stream. In many instances the incorporation of a diluent comprising pure non-olefinic hydrocarbons, such as n-pentane or selected fractions of natural or straight run gasoline, may be advantageously untilized in controlling the reaction temperature and maintaining a favorable hydrogen sulfide-olefin mol ratio without employment of excessive pressures. In special instances where mercaptans of high molecular weight and high viscosity are involved, the presence of a low-viscosity diluent greatly aids in the catalyst separation step.

In a specific preferred embodiment of the invention, a $C_{12}$-$C_{14}$ olefin mixture derived from the catalytic polymerization of $C_3$ and $C_4$ refinery olefins is employed in admixture with about 80 per cent n-pentane as the hydrocarbon feed to the reaction. Enough hydrogen sulfide is added to the hydrocarbon mixture to give an $H_2S$:olefin mol ratio of from about 2:1 to about 5:1. The resulting composite feed, under a pressure of about 100 to 500 pounds per square inch gage, is then injected into a reaction zone where intimate mixing of the feed and catalyst is accomplished. In this particular instance the reaction temperature may be maintained between about 40 to about 75° F. for optimum results, although higher and lower temperatures are operable. An emulsion of catalyst and product is continuously withdrawn from the reactor at a rate adjusted to give a contact time of about 20 to 30 minutes. The catalyst is separated from the hydrocarbon solution by gravity and is returned to the reactor, while the product stream is subjected to distillation for removal of excess hydrogen sulfide and the pentane diluent. Unreacted olefin is separated from the high-boiling mercaptan product by means of fractional distillation under reduced pressure.

The catalyst composition of this invention is prepared by treating orthophosphoric acid of variable water content with anhydrous boron fluoride until complete saturation has been realized. With 100 per cent phosphoric acid substantially one mol of boron fluoride is absorbed per mol of acid, while in case of aqueous solutions both the phosphoric acid and the water absorb boron fluoride approximately mol for mol. No theories are advanced as to the chemistry involved in the preparation of the catalyst, but it is presumed that a type of chemical combination often referred to as a complex or addition compound or compounds has resulted. Where 100 per cent phosphoric acid is concerned, the empirical representation of its complex with boron fluoride is $H_3PO_4 \cdot BF_3$. In the same manner catalysts prepared from aqueous phosphoric acid and boron fluoride might be considered to be a mixture of the components $H_3PO_4 \cdot BF_3$ and $H_2O \cdot BF_3$.

The phosphoric acid employed in preparing the preferred catalyst may be in concentrated form, ranging from the 85 per cent acid of commercial grade up to about 100 per cent $H_3PO_4$; or aqueous solutions containing as little as 20 to 40 per cent $H_3PO_4$ may be employed. For most applications the moderately concentrated to concentrated acid is ordinarily preferred. The readily available 85 per cent commercial acid yields a very satisfactory catalyst when saturated with boron fluoride. While orthophosphoric acid is preferred in preparing the catalysts of this invention, other oxygen-containing acids of phosphorus, such as for example phosphorous acid ($H_3PO_3$) in aqueous solution, may also be used, although less active catalysts usually result.

In the production of mercaptans with the above catalyst and by the hereinbefore described procedure, it is necessary to maintain a molal excess of hydrogen sulfide relative to the olefin content of the feed in order to favor the mercaptan reaction and to suppress undesirable polymerization and/or depolymerization of the olefin. Satisfactory reaction mixtures may have $H_2S$-olefin mol ratios of from about 1 to about 6 with intermediate ratios of about 2 to 5 being preferred.

Although the present process may be operated with a feed comprising only olefin and $H_2S$, the employment of an inert liquid hydrocarbon diluent is often advantageous. The use of a diluent is especially desirable in the preparation of high molecular weight mercaptans where moderate temperatures are necessary to prevent the fragmentation of the primary junction product. Furthermore, mercaptans having about 12 or more carbon atoms per molecule are quite viscous, rendering catalyst separation difficult unless a diluent is present. A further advantage with respect to the employment of a diluent is the maintenance of favorable $H_2S$-olefin mol ratios without resorting to excessively high pressures. Saturated hydrocarbons are ordinarily preferred as diluents and are usually selected from close-cut fractions of natural or straight run gasoline. The amount of diluent employed will obviously depend on any or all of the factors previously mentioned, and may for example vary from 10 to 90 volume per cent of the hydrocarbon feed.

Because of the high degree of activity displayed by the catalyst composition of this invention, moderate reaction temperature may be employed with a wide variety of olefin feed stocks. Substantially atmospheric temperatures, such as those ranging from about 32° F. to about 150° F. are usually sufficient to effect efficient conversion of olefins ranging from ethylene to $C_{16}$ or higher olefins. For the conversion of ethylene to ethyl mercaptan, the preferred temperature range may include 110 to about 150° F., while $C_3$ to $C_8$ olefins are advantageously reacted between about 80 and 110° F. Olefins having a carbon content of from 9 to 16 or more carbon atoms per molecule react readily at temperatures of about 32 to 80° F. with the preferred optimum temperature range being from about 40 to 50° F.

Because of the moderate reaction temperatures which are a feature of this invention, reaction pressures are largely determined by the volatility of the olefin, the hydrogen sulfide concentration, and the quantity of diluent employed. With the catalyst of this process, liquid phase operation is especially desirable and sufficient pressure and diluent are thus ordinarily employed in order to fulfill this condition. Thus pressures of from about 100 pounds per square inch gage or less to 1000 pounds or more are ordinarily adequate.

The rate of flow of reactants to the catalyst contacting zone is obviously dependent on several factors such as catalyst activity, nature of the olefin feed, and the desired depth of conversion. When temperature and pressure conditions are selected to conform with catalyst activity, the olefin feed rate, expressed independently of the $H_2S$ and diluent, may range from about 0.5 to about 5 volumes per volume of catalyst per hour for olefin conversion of 80 per cent or more per pass. Much higher rates of flow may of course be employed when a plurality of reactors in series is used.

In order to further illustrate the specific uses and advantages of the present invention, the following exemplary operations will be described. However, since these and numerous other process modifications will be obvious in the light of the instant disclosure, no undue limitations are intended.

Example I

Butene-2 was condensed with hydrogen sulfide in the presence of a boron fluoride-phosphoric acid catalyst to yield secondary butylmercaptan as the primary reaction product. The catalyst was prepared by saturating commercial 85% orthophosphoric acid with gaseous $BF_3$, while keeping the temperature of the acid below about 100° F. during the saturating operation. The reaction was carried out in a steel reactor equipped with a mechanical agitator to maintain a fine dispersion of the liquid catalyst in the reactants. The feed to the reactor comprised a blend of 20 per cent butene-2 in n-pentane, and contained a molal excess of hydrogen sulfide over the butene present. Product was continuously withdrawn from the reactor at a rate governed by the feed rate. A catalyst separating zone was provided to return catalyst to the reaction zone by gravity flow. General reaction conditions are herewith presented:

$H_2S$: butene, mol ratio _____ 3.0
Hydrocarbon: catalyst, volume ratio _____ 5.5
Reaction temperature, °F. _____ 75-80
Pressure, p. s. i. g. _____ 150
Reaction time, minutes _____ 20

The raw effluent was weathered to remove hydrogen sulfide and unreacted butene-2. The stabilized material was then washed with dilute caustic to remove traces of hydrogen sulfide and entrained catalyst prior to distillation. A mercaptan fraction with a distillation range of 182-186° F. was prepared and the physical constants were found to check with those of secondary butylmercaptan. Approximately 95 per cent of the depentanized material was mercaptan while the residue consisted almost entirely of polymerized butene. Approximately 92 per cent of the butene charge was converted in this single pass operation.

Example II

In this operation a $C_{12}$ to $C_{14}$ fraction of olefins derived from the high-boiling by-products of refinery codimer operation was reacted with hydrogen sulfide in the presence of boron fluoride-phosphoric acid catalyst prepared as in Example I. The olefinic material was blended with a 175-210° F. heptane cut from natural gasoline in a volume ratio of 1:10 to prepare the hydrocarbon charge. The final feed to the reactor consisted of the above hydrocarbon blend in which a molal excess of hydrogen sulfide was dissolved under pressure. The reaction proper was carried out in a steel turbo-mixer type of reactor with continuous removal of reaction products and recirculation of catalyst to the reaction zone. Reaction conditions were as follows:

$H_2S$: olefin, mol ratio _____ 2.2
Hydrocarbon: catalyst, volume ratio _____ 4.5
Reaction temperature, °F. _____ 75
Pressure, p. s. i. g. _____ 100
Reaction time, minutes _____ 15

The total effluent was weathered to remove most of the hydrogen sulfide. Entrained catalyst and last traces of hydrogen sulfide were then removed by washing with dilute caustic. The diluent was separated from the product by distillation at atmospheric pressure, while the final mercaptan fractionation was carried out under reduced pressure. The mercaptan products were distributed as follows: $C_4$ mercaptans in the diluent fractions; $C_8$ mercaptans in the unreacted olefin; and $C_{12}$-$C_{14}$ mercaptans substantially uncontaminated with non-mercaptan impurities. Approximately 85 per cent of the olefin charge was converted in a single pass with about 65 mol per cent of the converted olefin being recovered as $C_{12}$-$C_{14}$ mercaptan. The product yields are expressed in the subjoined tabulation.

| Products | Mols per 100 Mols of Olefin Converted |
|---|---|
| Butyl Mercaptans | 10.5 |
| Octyl Mercaptans | 18.5 |
| $C_{12}$-$C_{14}$ Mercaptans | 65.0 |
| Polymer and Loss | 6.0 |

The high boiling mercaptan products thus prepared are suitable for direct use as modifiers in the preparation of synthetic rubber, particularly of the buna-type.

Example III

A mixture of dodecylmercaptans was prepared by the interaction of commercial triisobutylene and hydrogen sulfide in the presence of boron fluoride-phosphoric acid catalyst prepared from the 85% acid. A blend of 10 per cent triisobutylene in n-pentane was saturated at 150 pounds gage pressure with hydrogen sulfide to prepare the feed stock. The reaction was carried out as a continuous operation as described in Example II. The pentane was fractionated out of the crude product and the subsequent distillation was carried out at a head temperature of about 200° F. with progressive reduction in distilling pressure. A summary of the results and operating conditions are given below:

$H_2S$: olefin, mol ratio _____ 6.5
Hydrocarbon: catalyst, volume ratio _____ 5.0
Contact time, minutes _____ 45.0
Reactor temperature, °F. _____ 40-45
Unreacted olefin, per cent of charge _____ 20
Mercaptans, mols per 100 mols of converted olefin:
   $C_4$ _____ 5.4
   $C_8$ _____ 14.6
   $C_{12}$ _____ 75.5
   Polymer and loss _____ 4.5

Example IV

A feed mixture comprising 12 mol per cent cyclohexene, 16 mol per cent hydrogen sulfide, and 72 mol per cent n-pentane was continuously charged to a turbo-mixer type reactor containing a boron fluoride-phosphoric acid catalyst. At an average temperature of 85° F. and a contact time of 20 minutes, approximately 95 per cent of the cyclohexene was converted in a single pass operation. Distillation of the product fraction indicated that 88 per cent of the converted cyclohexane was in the form of cyclohexyl mercaptan. The remaining 12 per cent consisted mostly of polymerized cyclohexene.

Although the invention has been described in detail with particular reference to preferred modifications, it will be appreciated that the process may be effected in manners other than those described. Various alternative operations will be apparent to one skilled in the art in view of the instant disclosure, and the invention is accordingly to be limited only by the accompanying claims.

The olefinic hydrocarbons which may be reacted with hydrogen sulfide in carrying out this invention are those containing at least one ethylenic bond, and include aliphatic olefins, cyclic olefins, and substituted aliphatic and cyclic olefins in which the substituting group or groups may be hydrocarbon or non-hydrocarbon radicals of such character that they do not interfere with the primary reaction.

We claim:

1. In the formation of organic sulfur compounds by the catalytic addition of a compound selected from the group consisting of hydrogen sulfide and mercaptans to an olefin, the improvement which comprises conducting said addition reaction in the presence of effective amounts of a liquid catalyst comprising an addition compound of boron fluoride and an oxygen-containing acid of phosphorus.

2. A process for the formation of organic sulfur compounds which comprises contacting an olefinic hydrocarbon with hydrogen sulfide in the presence of effective amounts of a liquid catalyst complex formed by bringing together boron fluoride and phosphoric acid under conditions such that the addition of hydrogen sulfide to the olefinic hydrocarbon takes place.

3. A process which comprises contacting an olefinic hydrocarbon with hydrogen sulfide in the presence of orthophosphoric acid saturated with boron fluoride under conditions such that the addition reaction of hydrogen sulfide with the olefinic hydrocarbon takes place.

4. A process for the formation of organic sulfur compounds, which comprises contacting an olefinic hydrocarbon with hydrogen sulfide in the presence of effective amounts of a liquid catalyst complex comprising boron fluoride and an oxygen-containing acid of phosphorus under conditions effecting the addition of hydrogen sulfide to the olefinic hydrocarbon.

5. A process for producing a mercaptan which comprises contacting an olefinic hydrocarbon with at least a stoichiometric amount of hydrogen sulfide in the presence of a liquid catalyst comprising effective amounts of an addition compound of boron fluoride and orthophosphoric acid under conditions effecting the addition of hydrogen sulfide to the olefinic hydrocarbon to produce said mercaptan.

6. A process for producing mercaptans which comprises contacting an olefin with hydrogen sulfide at a temperature within the range of about 32° F. to about 150° F. in the presence of a catalyst essentially comprising a liquid addition compound of boron fluoride and phosphoric acid formed by saturating phosphoric acid with boron fluoride thereby effecting the addition of hydrogen sulfide to the olefin to produce a mercaptan.

7. The process of claim 6 in which aqueous orthophosphoric acid containing about 85 per cent by weight of orthophosphoric acid is saturated with boron fluoride to form said catalyst.

8. A process for producing mercaptans which comprises contacting an olefinic hydrocarbon with hydrogen sulfide in admixture with an inert liquid hydrocarbon diluent in the presence of a liquid catalyst comprising effective amounts of an addition compound of boron fluoride and phosphoric acid under such conditions of temperature and pressure as to effect the addition of hydrogen sulfide to the olefinic hydrocarbon as the principal reaction.

9. The process of claim 8 in which a hydrogen sulfide to olefinic hydrocarbon mol ratio greater than one is maintained.

10. The process of claim 3 in which said olefinic hydrocarbon is an aliphatic monoolefin.

11. The process of claim 3 in which said olefinic hydrocarbon is a butene.

12. The process of claim 3 in which said olefinic hydrocarbon is a cyclo-olefin.

13. The process of claim 3 in which said olefinic hydrocarbon is cyclohexene.

14. A process for producing high-boiling mercaptans which comprises separating from effluents of an olefin polymerization process an olefinic hydrocarbon fraction essentially comprising olefins having from 12 to 14 carbon atoms per molecule, contacting said fraction together with a liquid saturated hydrocarbon diluent and hydrogen sulfide, under sufficient pressure to dissolve in the liquid reaction mixture a molar excess of hydrogen sulfide relative to the olefins present, with a liquid catalyst comprising effective amounts of an addition compound of boron fluoride and orthophosphoric acid at a temperature within the range of from about 32° F. to about 150° F. for a time such as to effect substantial addition of hydrogen sulfide to olefins, and recovering a mercaptan fraction comprising mercaptans so produced having from 12 to 14 carbon atoms per molecule.

15. A process for the preparation of a high-boiling mercaptan which comprises contacting an olefin of from 12 to 14 carbon atoms per molecule with hydrogen sulfide in the presence of a liquid catalyst comprising effective amounts of an addition compound of boron fluoride and phosphoric acid under such conditions that the addition of hydrogen sulfide to the olefin is the principal reaction of the process.

16. The process of claim 1 in which said reaction is effected essentially in liquid phase.

WALTER A. SCHULZE.
WILLIE W. CROUCH.

REFERENCES CITED

The following references are of record in the file of this patent:

UNITED STATES PATENTS

| Number | Name | Date |
|---|---|---|
| 1,836,170 | Johansen | Dec. 15, 1931 |
| 1,836,171 | Johansen | Dec. 15, 1931 |
| 1,836,183 | Johansen | Dec. 15, 1931 |
| 2,051,807 | Allen | Aug. 25, 1936 |
| 2,052,268 | Williams | Aug. 25, 1936 |
| 2,101,096 | Reuter | Dec. 7, 1937 |
| 2,211,990 | Shoemaker | Aug. 20, 1940 |

FOREIGN PATENTS

| Number | Country | Date |
|---|---|---|
| 532,676 | Great Britain | Jan. 29, 1941 |

OTHER REFERENCES

Duffey, "Industrial and Engineering Chemistry," vol. 26, pp. 91–3, 1934.

Ipatieff, "Jour. Am. Chem. Soc.," vol. 60, pp. 2731–4, 1938.

Certificate of Correction

Patent No. 2,426,647: September 2, 1947.

WALTER A. SCHULZE ET AL.

It is hereby certified that error appears in the printed specification of the above numbered patent requiring correction as follows: Column 6, lines 70 and 71, for "cyclohexane" read *cyclohexene*; and that the said Letters Patent should be read with this correction therein that the same may conform to the record of the case in the Patent Office.

Signed and sealed this 20th day of April, A. D. 1948.

[SEAL]

THOMAS F. MURPHY,
*Assistant Commissioner of Patents.*